United States Patent
Kim et al.

(10) Patent No.: US 11,575,265 B2
(45) Date of Patent: Feb. 7, 2023

(54) METHOD FOR CONTROLLING OUTPUT LEVEL OF MODULAR MULTILEVEL CONVERTER FOR REDUCING POWER SYSTEM FREQUENCY CHANGE

(71) Applicants: HYOSUNG HEAVY INDUSTRIES CORPORATION, Seoul (KR); INDUSTRY-ACADEMIC COOPERATION FOUNDATION, YONSEI UNIVERSITY, Seoul (KR)

(72) Inventors: Hee Jin Kim, Seoul (KR); Dong Su Lee, Anyang-si (KR); Kyeon Hur, Seoul (KR); Jae Sik Kang, Seoul (KR); Sang Min Kim, Seoul (KR)

(73) Assignee: Hyosung Heavy Industries, Seoul (KR)

(*) Notice: Subject to any disclaimer, the term of this patent is extended or adjusted under 35 U.S.C. 154(b) by 313 days.

(21) Appl. No.: 16/958,268

(22) PCT Filed: Dec. 21, 2018

(86) PCT No.: PCT/KR2018/016408
§ 371 (c)(1),
(2) Date: Jun. 26, 2020

(87) PCT Pub. No.: WO2019/132435
PCT Pub. Date: Jul. 4, 2019

(65) Prior Publication Data
US 2020/0335975 A1    Oct. 22, 2020

(30) Foreign Application Priority Data
Dec. 28, 2017    (KR) .................. 10-2017-0183190

(51) Int. Cl.
*H02M 7/483*    (2007.01)
*H02J 3/36*    (2006.01)
*H02M 5/458*    (2006.01)

(52) U.S. Cl.
CPC ............. *H02J 3/36* (2013.01); *H02M 5/4585* (2013.01); *H02M 7/483* (2013.01)

(58) Field of Classification Search
CPC .......... H02J 3/36; H02J 3/381; H02J 2300/28; H02J 3/241; H02M 5/458; H02M 5/4585;
(Continued)

(56) References Cited

U.S. PATENT DOCUMENTS

2020/0274361 A1*   8/2020  Armschat ................ H02J 3/32

FOREIGN PATENT DOCUMENTS

JP    2017-143618 A    8/2017
KR    10-1089937 B1    12/2011
(Continued)

OTHER PUBLICATIONS

Konstantinou, G.S. et al., "Effect of Redundant Sub-module Utilization on Modular Multilevel Converters", 2012 IEEE Int. Conf. on Industrial Technology, Mar. 9, 2012, pp. 815-820.

*Primary Examiner* — Peter M Novak
(74) *Attorney, Agent, or Firm* — Novick, Kim & Lee PLLC; Jae Youn Kim

(57) ABSTRACT

A method of controlling output levels of an MMC converter to reduce fluctuation in a power grid frequency, which adjusts an output level of the MMC converter in response to a change in a power grid frequency of a power grid system in the MMC converter connected to a grid system, is proposed. The method includes a detection step of detecting a power grid frequency of a grid connected to the MMC converter in real time, a comparison step of comparing the detected power grid frequency with a preset reference power
(Continued)

grid frequency, and an adjustment step of adjusting a number of output levels of the MMC converter to reduce a difference between the detected power grid frequency and the reference power grid frequency when the detected power grid frequency and the reference power grid frequency are different from each other.

5 Claims, 12 Drawing Sheets

(58) Field of Classification Search
CPC ....... H02M 7/483; H02M 1/325; Y02E 10/72; Y02E 10/76; Y02E 60/60
See application file for complete search history.

(56) References Cited

FOREIGN PATENT DOCUMENTS

| KR | 10-2013-0066862 A | 6/2013 |
|----|-------------------|--------|
| KR | 10-1553480 B1 | 9/2015 |
| KR | 10-2017-0013773 A | 2/2017 |

\* cited by examiner

METHOD FOR CONTROLLING OUTPUT LEVEL OF MODULAR MULTILEVEL CONVERTER FOR REDUCING POWER SYSTEM FREQUENCY CHANGE

TECHNICAL FIELD

The present invention relates to a method for controlling an output level of a modular multilevel converter (MMC) and more particularly, to a method of controlling output levels of an MMC converter to reduce fluctuation in a power grid frequency, which adjusts an output level of the MMC converter in response to a change in a power grid frequency of a power grid system in the MMC converter connected to a grid system. AC voltages have four components in grids: frequency; phase rotation, phase angle, and voltage magnitude. Controlling the MMC voltage helps to control the output frequency.

BACKGROUND ART

In general, an MMC converter includes a plurality of submodules connected in series with each other to perform voltage conversion and serves as a passage of current for power transmission. Recently, the MMC converter is actively used for HVDC or Medium Voltage DC Transmission (MVDC) to convert power produced in a large-scale offshore wind park into DC voltage.

When a disturbance such as a generator drop or an increase in load occurs in such a power system, the active power fluctuates. When the active power fluctuates, the grid frequency of the power system decreases due to the lack of electric energy. In Korea, when a frequency decreases below 60 Hz, a low frequency load blocking relay operates to cut off the load in proportion to the dropped frequency in order to prevent the generator from dropping off.

After the disturbance occurs, the lowest frequency of the power grid system becomes an important criterion for determining the reliability of the power grid system, and it is important not to drop a power grid frequency of the power grid in order to prevent load blocking.

Conventionally, as a technique that utilizes the inertia energy of a wind power generator, a wind power generator inertial control system that is mainly used in large-scale systems or synchronous generator-based systems has been proposed. This inertia control of wind power generation operates based on frequency measurement.

The drop and fluctuation in a frequency is reduced by transferring inertial energy of wind power generation to a grid when the frequency of a synchronous generator drops when generator capability or load capability varies, and there is a limit in inertia control of wind power generation, and it is difficult to apply frequency characteristics for a change in active power to other grids.

DISCLOSURE

Technical Problem

The present invention solves the above-mentioned problems of the prior art. An object of the present invention is to provide a method for controlling output levels of an MMC converter for reducing fluctuations in a power grid frequency by adjusting output levels of the MMC converter in response to fluctuations in the power grid frequency of a power gird due to disturbance in MMC converter connected to the power grid.

In addition, another object of the present invention is to provide a method for controlling output levels of an MMC converter that allows inertial energy to be injected into an AC terminal or a DC terminal by using a voltage of a submodule that varies according to the control of the output level of the MMC converter.

Technical Solution

In order to accomplish the above object, an embodiment of the present, invention provides a method for controlling output levels of an MMC converter for reducing fluctuations in a power grid frequency, which includes a detection step of detecting a power grid frequency of a grid connected to the MMC converter in real time; a comparison step of comparing the detected power grid frequency with a preset reference power grid frequency; and an adjustment step of adjusting a number of output levels of the MMC converter to reduce a difference between the detected power grid frequency and the reference power grid frequency when the detected power grid frequency and the reference power grid frequency are different from each other.

The adjustment step includes adjusting the number of output levels of the MMC converter calculated by the following equation.

$$n_{level} = \frac{V_{DC}}{V_{SM,avg}}$$

($n_{level}$ is the adjusted number of output levels of the MMC converter, VDC is the rated DC voltage of the MMC converter, $V_{SM,avg}$ is the mean voltage of the all submodules of the MMC converter when the detected power grid frequency is equal to the reference power grid frequency)

The adjustment step includes adjusting the number of output levels of the MMC converter calculated by the following equation.

$$n_{level} = \frac{V_{DC}}{\sqrt{K_2 V_{SM,avg}^2}} = \frac{N_{level}}{\sqrt{K_2}}$$

$$K2 = 1 - 0.75 \cdot (f_0 - f) / (K_{f,max} \cdot f_0)$$

($N_{level}$ is the number of output levels of the MMC converter before adjustment, $f_0$ is a preset reference power grid frequency of the grid, f is a power grid frequency detected in the grid, and $K_{f,max}$ is a preset control parameter constant)

The method further includes a step of transferring a voltage corresponding to a difference between an output voltage of each of submodules which are operated according to the calculated number of output levels of the MMC converter after the adjustment step and the rated DC voltage to the grid.

According to an embodiment, the adjustment step includes generating a submodule voltage command value corresponding to the difference between the power grid frequency and the reference power grid frequency; generating a d-axis current control command value for controlling active power through PI control to reduce a difference between the generated submodule voltage command value and the mean voltage of the submodule; and controlling an AC current output from the MMC converter according to the generated d-axis current control command value.

According to another embodiment, the adjustment step includes generating a DC voltage command value of the MMC converter corresponding to a difference between the power grid frequency and the reference power grid frequency; generating a DC current command value through PI control to reduce a difference between the generated DC voltage command value and a DC voltage of the MMC converter; and controlling a DC current output from the MMC converter according to the generated DC current command value.

According to still another embodiment, the adjustment step includes generating a submodule voltage command value corresponding to a difference between a DC voltage of an output terminal of the MMC converter and the rated DC voltage; generating a DC current command value through PI control to reduce a difference between the submodule voltage command value and a mean voltage of the submodule; and controlling a DC current output from the MMC converter according to the generated DC current command value.

Advantageous Effects

According to the present invention, it is possible to minimize the fluctuation of the grid frequency by adjusting the output levels of the MMC converter when the power grid frequency fluctuates due to disturbance in the MMC converter connected to the grid.

In addition, according to the present invention, it is possible to inject inertial energy into the AC or DC terminal by using the voltage of the submodule which varies due to the adjustment of the output level of the MMC converter.

MODE FOR INVENTION OR BEST MODE

Figure 1:
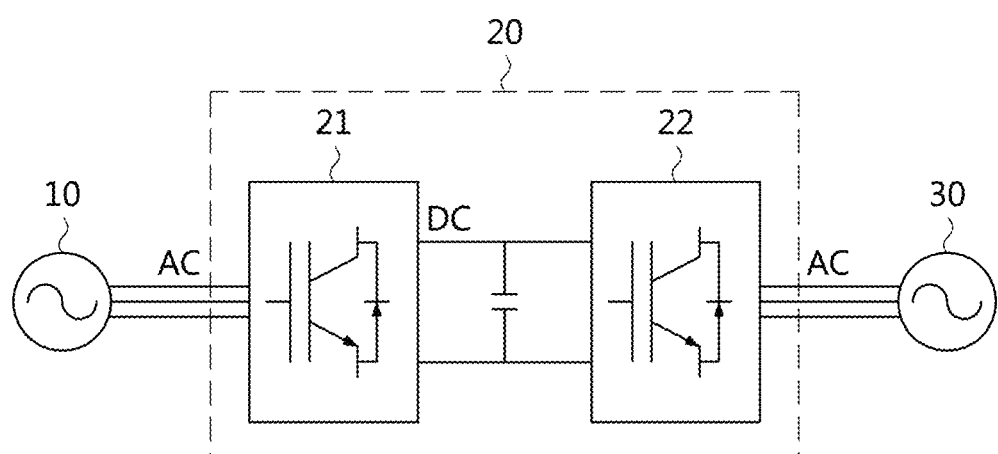
FIG. 1 is an exemplary configuration diagram of a power grid system to which the present invention is applied.

Hereinafter, embodiments of the present disclosure will be described in detail with reference to the exemplary drawings. In adding reference numerals to the components of each drawing, it should be noted that the same reference numerals are assigned to the same components as much as possible even though they are shown in different drawings. In addition, in describing the embodiment of the present invention, if it is determined that the detailed description of the related known configuration or function interferes with the understanding of the embodiment of the present invention, the detailed description thereof will be omitted.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that if it is described in the specification that one component is "connected," "coupled" or "joined" to another component, the former may be directly "connected," "coupled," and "joined" to the latter or "connected", "coupled", and "joined" to the latter via another component.

FIG. 1 is an exemplary configuration diagram of a power conversion system to which the present invention is applied. Referring to FIG. 1, a power conversion system according to the present invention is composed of an AC-DC-AC power conversion device 20 that transmits bi-directional power through power conversion between a generator 10 and an AC-power grid system 30. The AC-DC-AC power conversion device 20 is preferably composed of an MMC converter.

In such a power conversion system, the generator 10 is a facility for generating power, for example, a wind power generator. The AC-DC-AC current conversion device 20 includes a first MMC converter 21 connected to the side of the generator 10 and a second MMC converter 22 connected to the side of the AC power grid system 30, and the first and second MMC converters 21 and 22 respectively perform a rectifier function and an inverter function.

Figure 2:
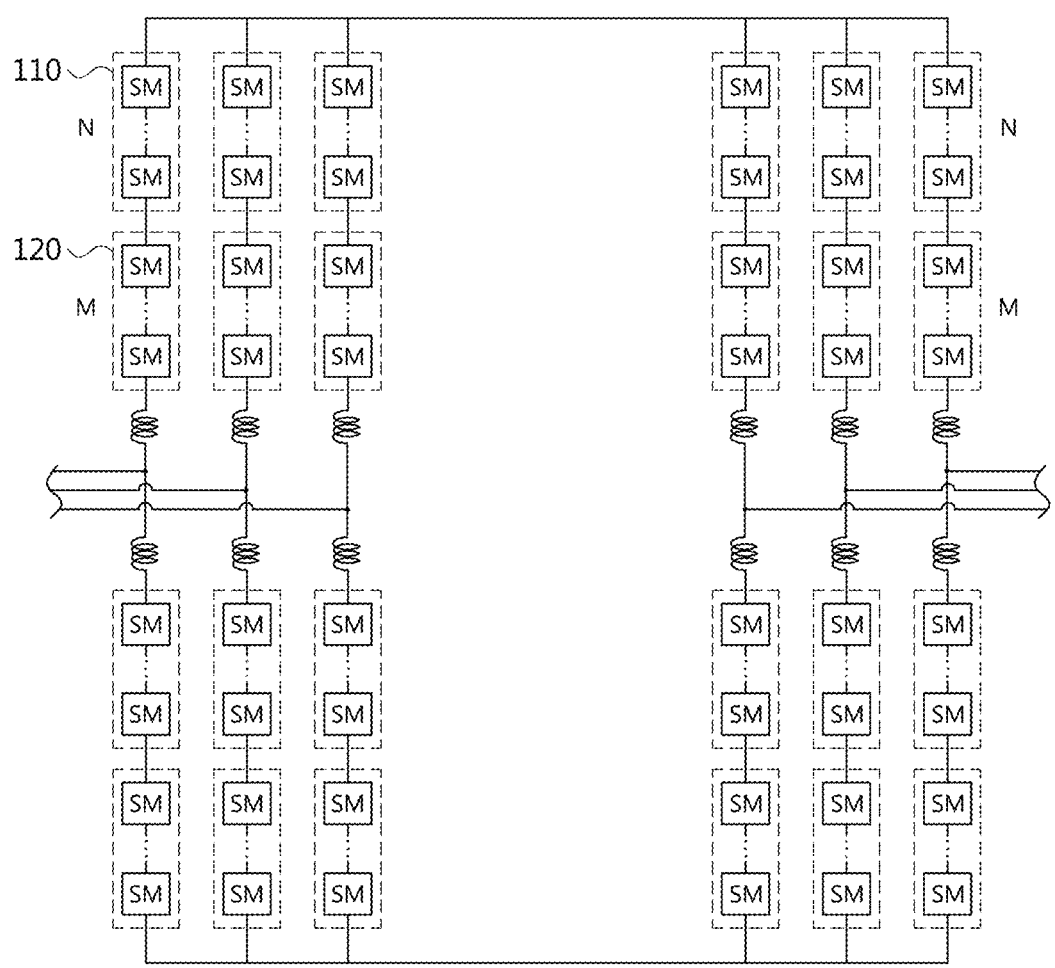
FIG. 2 is an exemplary configuration diagram of an MMC converter according to an embodiment of the present invention.

FIG. 2 is an exemplary configuration diagram of an MMC converter according to an embodiment of the present invention. Referring to FIG. 2, the first and second MMC converters according to the present invention are each composed of three phases, each phase is composed of an upper converter arm and a lower converter arm, and each converter arm is composed of a reactor and a plurality of submodules (SM) connected in series to each other. The first MMC converter 21 connected to the generator 10 and the second MMC converter 22 connected to the AC power grid system 30 preferably have the same configuration, but switching of an internal semiconductor switch is applied differently. AC-DC and DC-AC conversion is performed according to the switching.

Each submodule SM is composed of a bridge circuit including a plurality of semiconductor switches and one capacitor. The output voltage is formed by a capacitor voltage Vcap or a 0(zero) voltage according to on/off of the semiconductor switch. When the converter arm has N submodules, the maximum output voltage is N×Vcap and the minimum voltage is 0.

The plurality of submodules SM constituting one converter arm includes N submodules 110 participating in the operation of the MMC converter and M redundant submodules 120 that are to participate in operation when a fault occurs in the N submodules. A faulty submodule is excluded from operation by bypassing a current. Since the redundant submodule participates in the operation as many as the number of faulty submodules among N submodules participating in the operation, the number of submodules participating in the operation is instantaneously maintained to N.

Since the M redundant submodules 120 need to immediately participate in operation when a fault occurs in the submodules 110 which is in operation, the M redundant submodules 120 necessarily always store a constant voltage in the capacitor. In other words, when a fault occurs in the N submodules 110, some of the redundant submodules 120 need to immediately participate in operation to prevent problems in the operation of the MMC converter, so that it is required to maintain the balancing of the DC voltages of all N+M submodules. To this end, carriers are allocated to all N+R submodules 110 and 120 including the redundant submodules 120 respectively, to cause them to participate in on/off switching, thereby maintaining overall balancing. This means that the number of submodules operating to instantaneously form N+1 output levels is N, but N+M submodules rotate to participate in switching. The on/off of N+M submodules is controlled by a control unit (not shown).

Figure 3:
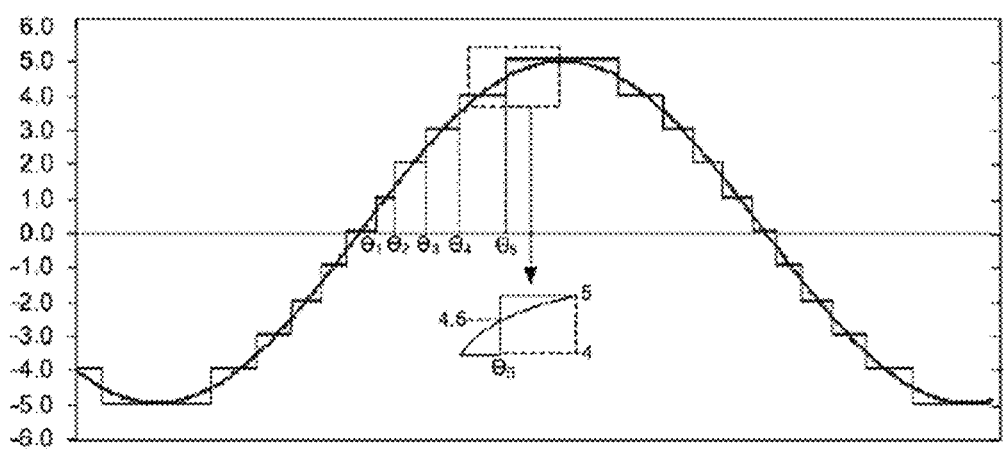
FIG. 3 is an exemplary diagram of an output voltage of a submodule according to an embodiment of the present invention.

FIG. 3 is an exemplary diagram of an output voltage of a submodule according to an embodiment of the present invention. As illustrated in FIG. 3, the switching time is determined by selecting an output level closer to a reference voltage among the output levels of the output voltage formed in every sampling in N submodules during operation. As in the example of FIG. 3, when the output level of the voltage formed by the reference wave having a magnitude of 5 is 11 levels, the output voltage has 11 output levels by counting a difference of 1 from −5 to +5. Therefore, when the reference voltage at the time of sampling is a value between 3.5 and 4.5, the output level is formed at 4, and when the reference voltage is 4.5 or more, the output level is formed at 5.

In this way, when N submodules participate in the operation in the MMC converter, an output voltage of N+1 levels is formed. Since the capacitor voltages of the N submodules are accumulated in a stepwise manner to generate an AC voltage waveform of the MMC converter, each capacitor voltage is kept constant to reduce the high frequency level of the AC voltage. Accordingly, an algorithm for maintaining a constant voltage of each capacitor of the submodule is applied to the MMC converter.

Figure 4:
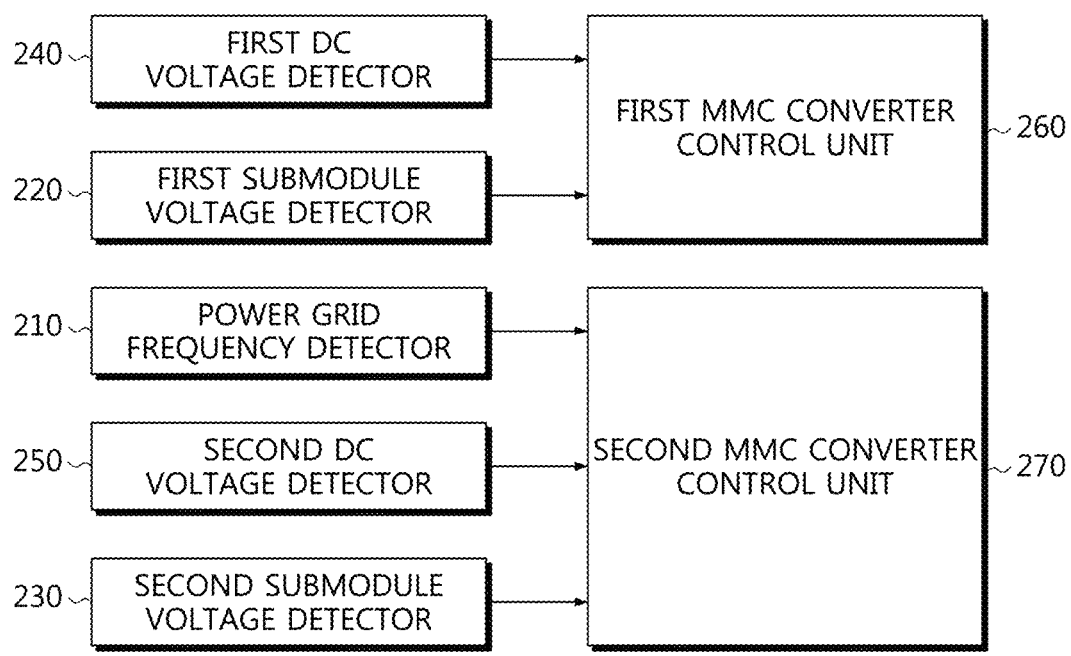
FIG. 4 is a block configuration diagram of an MMC converter control system according to the present invention.
Figure 5:
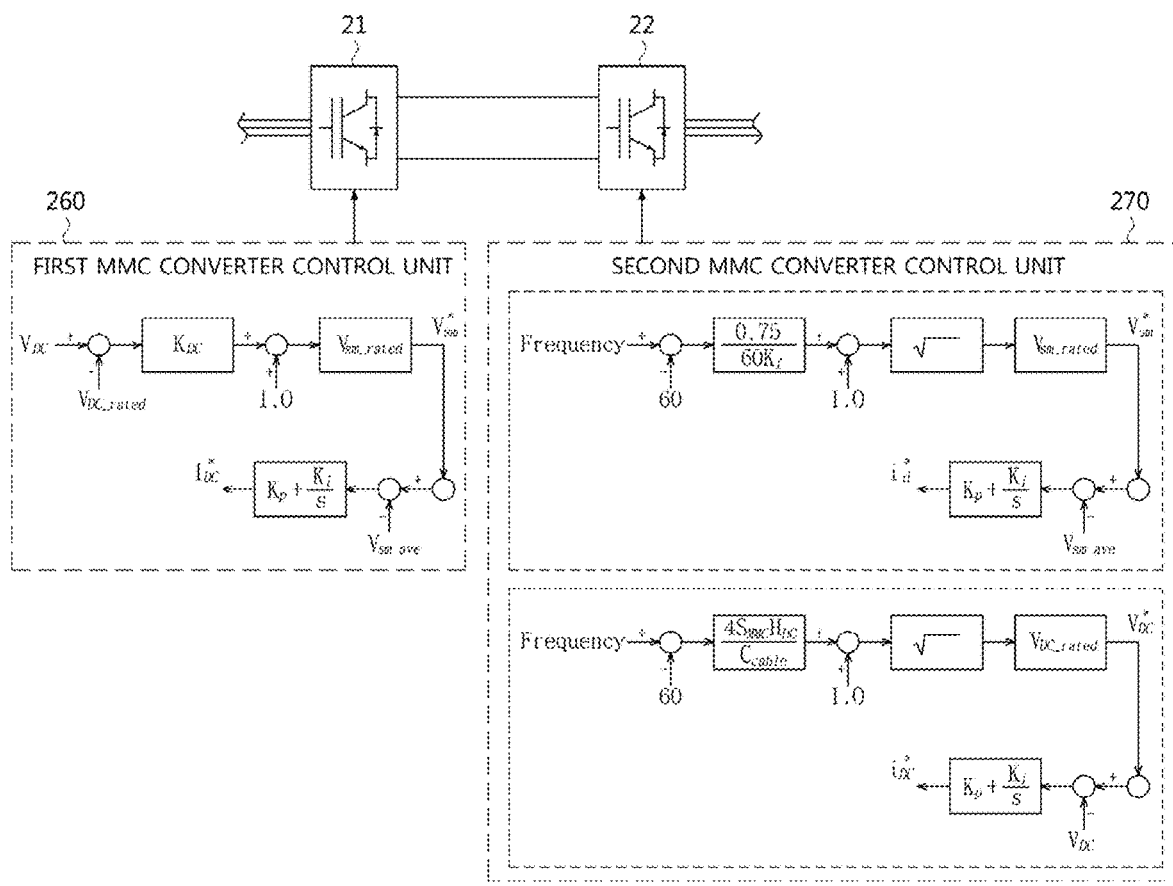
FIG. 5 is an operation configuration diagram of the MMC converter control system according to the present invention.

FIG. 4 is a block configuration diagram of an MMC converter control system according to the present invention, and FIG. 5 is an operation configuration diagram of the MMC converter control system according to the present invention. Referring to FIGS. 4 and 5, an MMC converter control system according to the present invention includes an AC power grid frequency detector 210, first and second submodule voltage detectors 220 and 230, first and second DC voltage detectors 240 and 250, a first MMC converter control unit 260 and a second MMC converter control unit 270.

The AC power grid frequency detector 210 detects a power grid frequency for a voltage in the AC power grid system 30. The AC voltage generated by the generator 10 is subjected to AC-DC-AC conversion through the AC-DC-AC power converter 20, so that an AC voltage of a desired magnitude is supplied to the AC grid system 30. In this case, when a disturbance such as a generator drop or load fluctuation occurs in the power grid system, fluctuations occur in the power grid frequency, and the power grid frequency is detected in real time by the AC power grid frequency detector 210.

The first and second submodule voltage detectors 220 and 230 respectively detect voltages stored in the capacitors inside the submodules SM respectively constituting the converter arms of the first and second MMC converters. In addition, the first and second submodule voltage detectors 220 and 230 may detect not only the voltage for each of a plurality of submodules, but also a voltage of each phase and the total submodule voltage, and it is also possible to detect the input power and output power of the MMC converter using the detected voltage of the submodule.

The first and second DC voltage detectors 240 and 250 detect DC voltage stored in the capacitors in the submodules of the first and second MMC converters.

The first MMC converter control unit 260 generates a DC current command value by performing PI control to reduce the difference between the DC voltage of the submodule detected by the first MMC converter 21 and the preset rated DC voltage of the submodule, and controls the DC current using the generated DC current command value.

The second MMC converter control unit 270 generates a submodule voltage command value corresponding to the difference between the power grid frequency detected in the power grid and a preset reference power grid frequency, generates a d-axis current control command value for controlling active power through PI control to reduce the generated submodule voltage command value and a mean voltage of the submodule, and controls the AC current output to the second MMC converter 22 according to the d-axis current control command value.

In addition, the second MMC converter control unit 270 generates a submodule voltage command value corresponding to a difference between the power grid frequency detected in the power grid and a preset reference power grid frequency, generates a DC current command value through PI control to reduce a difference between the generated DC voltage command value and the DC voltage of the second MMC converter 22, and controls the DC current output to the second MMC converter 22 according to the DC current command value.

Figure 6:
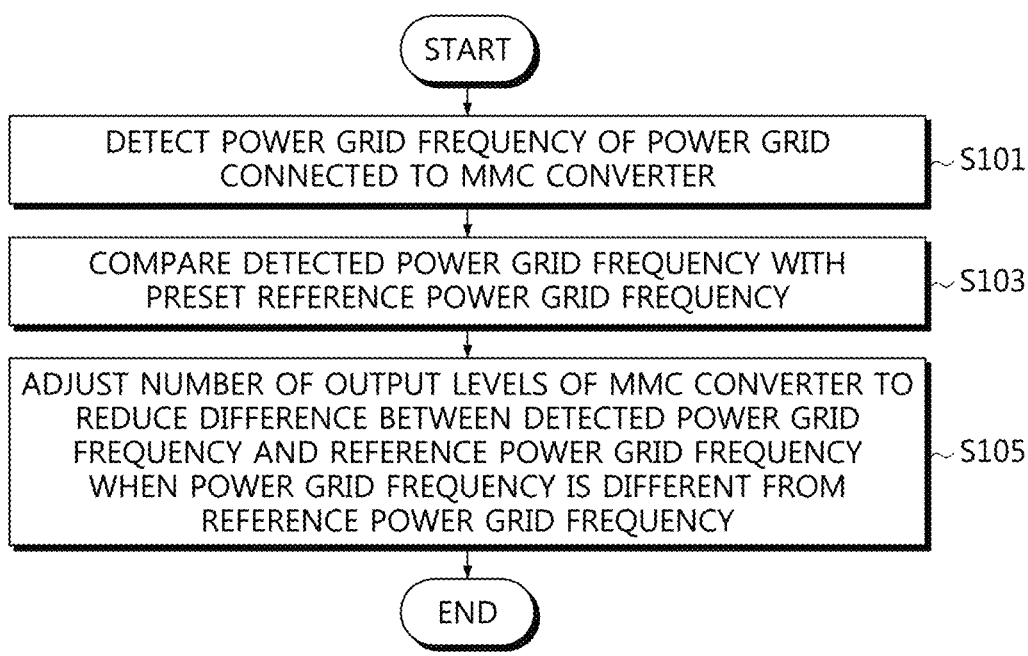
FIG. 6 is a flowchart illustrating a method of controlling an output level of an MMC converter for reducing fluctuation in a system frequency according to an embodiment of the present invention.

FIG. 6 is a flowchart illustrating a method of controlling an output level of an MMC converter for reducing fluctuation in a system frequency according to an embodiment of the present invention. Referring to FIG. 6, the generator 10 according to the present invention and the first MMC converter are connected, and the AC power grid system 20 and the second MMC converter are connected.

In the MMC converter, a plurality of submodules are connected in series, and the plurality of submodules are composed of N submodules participating in the operation of the MMC converter and M redundant submodules provided as being redundant. In this case, the output of the N submodules participating in the operation forms N+1 output levels.

In the method of controlling output levels of the MMC converter according to the present invention, a power grid frequency of a power grid system connected to the MMC converter is detected in real time (S101). Thereafter, the power grid frequency detected in real time is compared with a preset reference power grid frequency in the power grid (S103). When the detected power grid frequency and the reference power grid frequency are different from each other as a result of comparison, the number of output levels of the MMC converter is adjusted to reduce the difference between the detected power grid frequency and the preset reference power grid frequency (S105).

In this case, adjusting the number of output levels of the MMC converter may mean adjusting the number of submodules participating in the operation of the MMC converter. For example, when the power grid frequency fluctuates due to disturbance to cause a difference with a reference power grid frequency while N submodules form the N+1 output levels by participating in operation, the number of submodules participating in the operation is adjusted to reduce the difference between the power grid frequency and the reference power grid frequency, that is, to be N+1+n or N+1−n output levels.

Here, when the number of submodules is adjusted as described above, the DC voltage stored in each submodule may vary. When the number of submodules participating in the operation of the MMC converter increases, the voltage stored in each submodule is smaller than the rated DC voltage. In this case, the voltage stored in each submodule is transferred as inertial energy through the AC terminal or the DC terminal. As described above, according to the present invention, by adjusting the number of submodules participating in the operation of the MMC converter to adjust the output levels of the MMC converter, it is possible to change the voltage stored in each submodule and transfer remaining energy to the AC side or DC side as the inertial energy without affecting the output of the MMC converter according to the change in the voltage.

Accordingly, the output levels of the MMC converter are adjusted as a disturbance occurs in the generator or the power grid system to enable the stable supply of power. Moreover, even when there is a change in the active power of the system due to the disturbance, a damping function is performed by the inertial energy in response to the change in the active power, thus enabling stable supply of power.

For the transmission of the inertial energy, after step S105, the voltage corresponding to the difference between the output voltage of each submodule operated according to the number of output levels of the MMC converter and the preset rated DC voltage is transferred to the AC-side grid or the DC side.

In FIG. 6, the number of output levels of the MMC converter is calculated by Equation 1.

$$n_{level} = \frac{V_{DC}}{V_{SM,avg}} \quad \text{[Equation 1]}$$

In Equation 1, $n_{level}$ is the adjusted number of output levels of the MMC converter, VDC is the rated DC voltage of the MMC converter, $V_{SM,avg}$ is the mean voltage of the all submodules of the MMC converter when the detected power grid frequency is equal to the reference power grid frequency.

In addition, the number of output levels of the MMC converter may also be calculated by Equation 2. This is an example in which parameters applied as the same result as in Equation 1 are applied differently.

$$n_{level} = \frac{V_{DC}}{\sqrt{K_2 V_{SM,avg}^2}} \quad \text{[Equation 2]}$$
$$= \frac{N_{level}}{\sqrt{K_2}}$$
$$K_2 = 1 - 0.75 \cdot (f_0 - f)/(K_{f,max} \cdot f_0)$$

In Equation 2, $N_{level}$ is the number of output levels of the MMC converter before adjustment, $f_0$ is a preset reference power grid frequency of the power grid, f is a power grid frequency detected in the power grid, and $K_{f,max}$ is a preset control parameter constant. In Equation 2, the adjusted number of output levels is calculated by considering the number of output levels of the MMC converter before adjustment, the detected power grid frequency, and the reference frequency as factors.

In this case, the output levels of the upper converter arm and the lower converter arm may be determined by Equation 3 below in response to the adjusted number of output levels in the MMC converter as described above.

$$n_{uj}, \text{ON} = \text{round}\left(((-m_j - m_{z,j}) + 1)\frac{n_{level}}{2}\right) \quad \text{[Equation 3]}$$
$$n_{lj}, \text{ON} = \text{round}\left(((m_j - m_{z,j}) + 1)\frac{n_{level}}{2}\right)$$

In Equation 3, $n_{uj,on}$ is the number of output submodules of the upper converter arm when j is a, b, and c phases, and $n_{lj,on}$ is the number of the output submodules of the lower converter arm when j is a, b and c phases, $m_j$ is the modulation signal when j is a, b and c phases, $m_{z,j}$ is the modulation signal for controlling a circulating current when j is a, b and c phases, and round is a function that creates the nearest integer.

Figure 7:
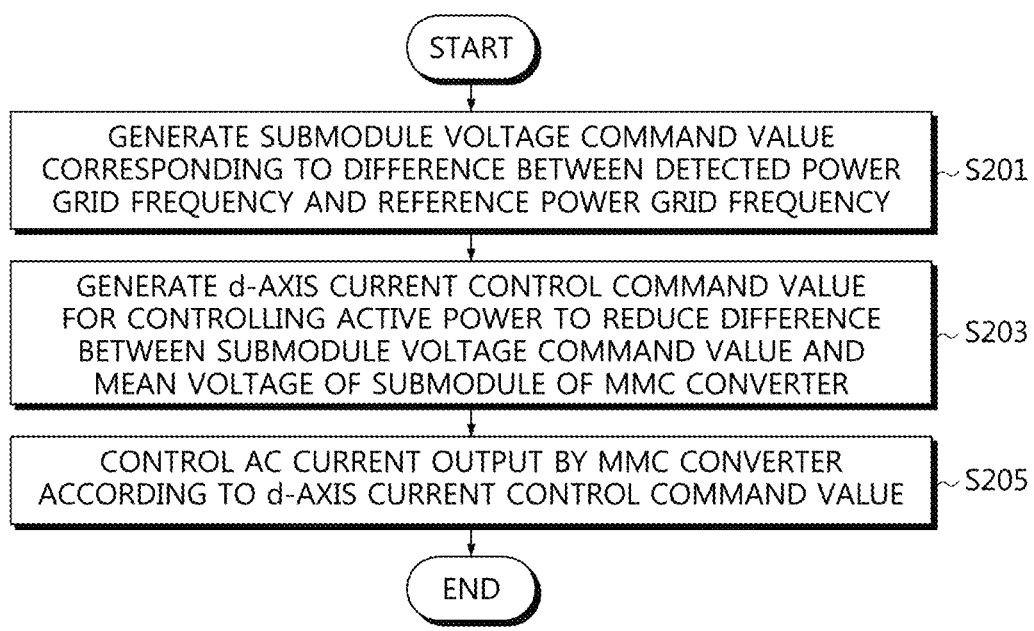
FIGS. 7 to 9 are flowcharts illustrating a process of adjusting the number of output levels of an MMC converter according to an embodiment of the present invention.
Figure 8:
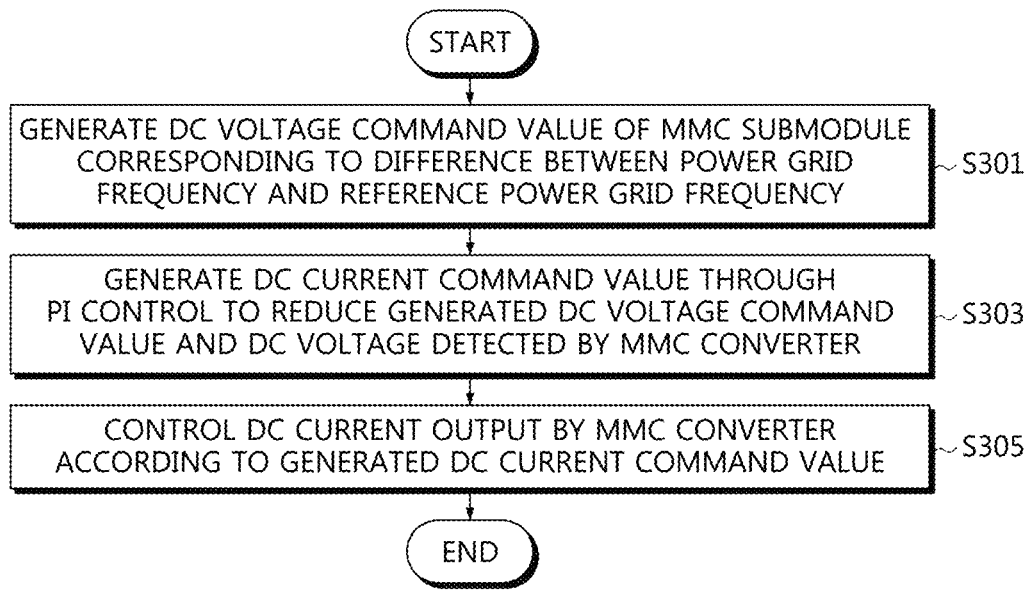
Figure 9:
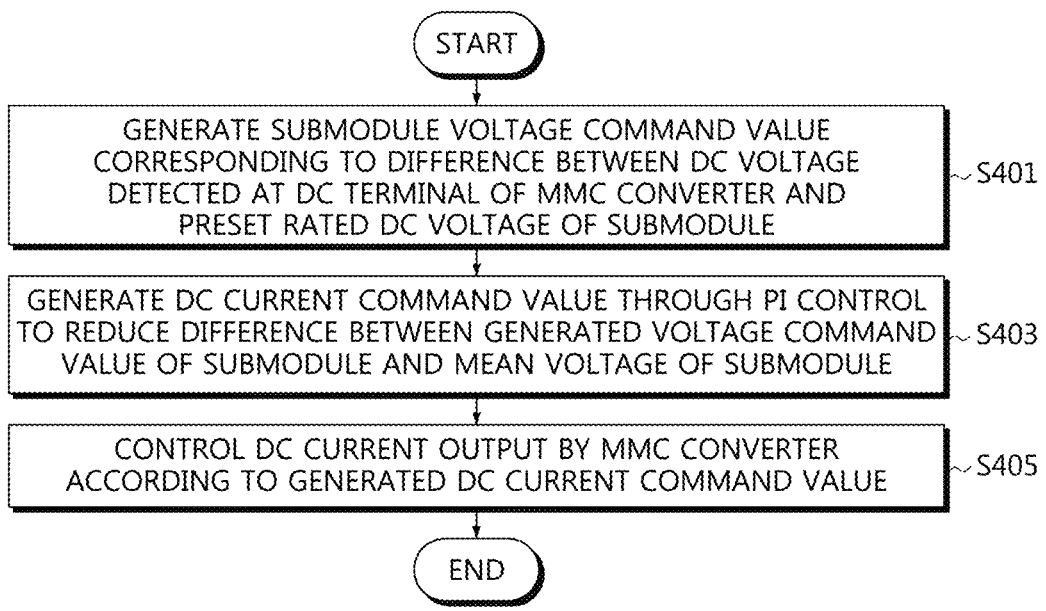

FIGS. 7 to 9 are flowcharts illustrating a process of adjusting the number of output levels of an MMC converter according to an embodiment of the present invention.

First, in the embodiment of FIG. 7, a submodule voltage command value corresponding to a difference between a grid frequency detected in the power grid and a preset reference grid frequency is generated (S201). In order to reduce the difference between the generated submodule voltage command value and the average voltage of the submodule of the MMC converter, a d-axis current control command value for controlling active power is generated through proportional integral control (S203). The AC current output from the MMC converter is controlled according to the generated d-side current control command value (S205). In order to control the AC current, each submodule switches the internal semiconductor switch according to the d-side current control command value.

In another embodiment of FIG. 8, a DC voltage command value of the MMC converter corresponding to the difference between the power grid frequency detected in the power grid and a preset reference power grid frequency is generated (S301). To reduce the difference between the DC voltage command value generated in this way and the DC voltage detected by the MMC converter, a DC current command value is generated through PI control (S303). The DC current output from the MMC converter is controlled according to the generated DC current command value (S305). In order to control the DC current, each submodule performs a switching operation of an internal semiconductor switch according to the DC current command value.

In another embodiment of FIG. 9, a submodule voltage command value corresponding to a difference between the DC voltage detected at the DC terminal of the MMC converter and the DC rated voltage of the preset submodule is generated (S401). The DC current command value is generated through PI control so as to reduce the difference between the generated submodule voltage command value and the average voltage of the submodule (S403). The DC current output from the MMC converter is controlled according to the generated DC current command value (S403). In order to control the DC current, each submodule performs a switching operation of an internal semiconductor switch according to the DC current command value.

FIGS. 10 to 12 are graphs of experimental results for comparing before and after application of an output level control method of an MMC converter according to an embodiment of the present invention. 10 to 12 are for the case where the inertia of the MMC converter is not provided, the case where the inertia is provided at HMMC=1.7, 60-59.8 Hz, and the case where the inertia is provided at HMMC=0.8458, 60-59.6 Hz, respectively. It shows the change of the power grid frequency, the voltage change of the submodule, and the power change amount of HVDC.

Figure 10A:
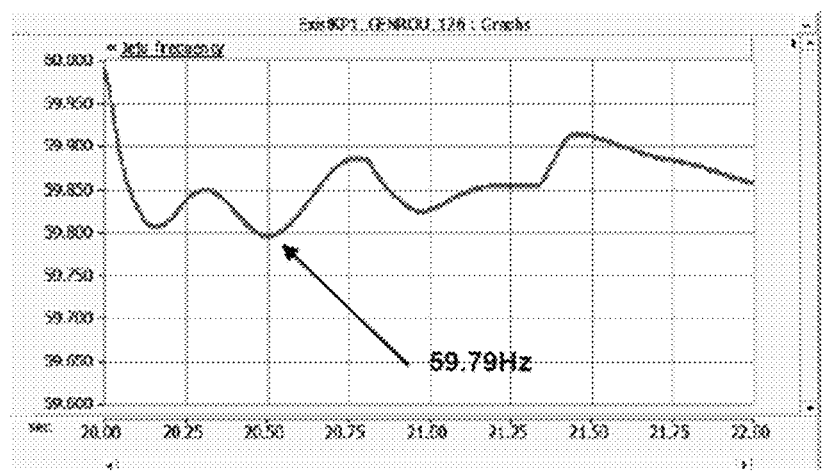
FIGS. 10A-10C, FIGS. 11A-11C and FIGS. 12A-12C are graphs of experimental results for comparing before and after application of an output level control method of an MMC converter according to an embodiment of the present invention.
Figure 10B:
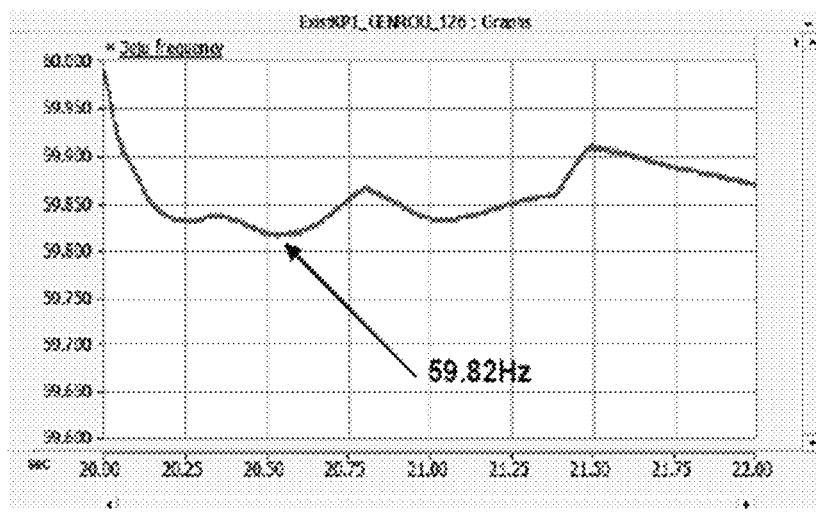
Figure 10C:
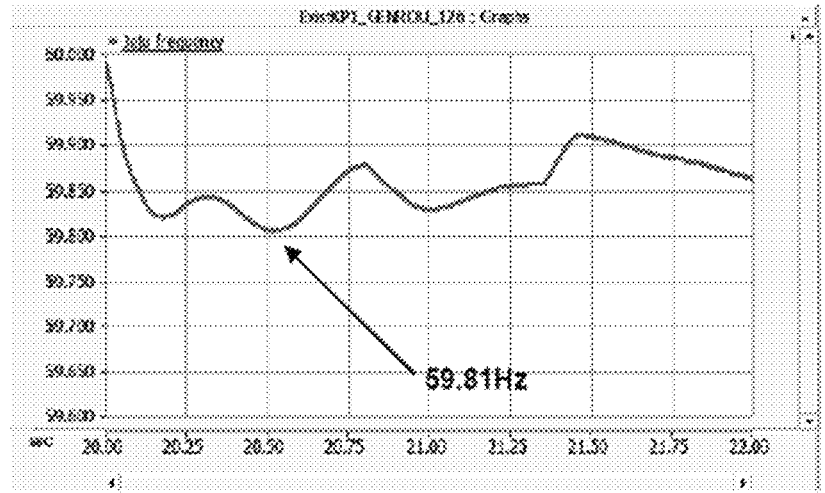
Figure 11A:
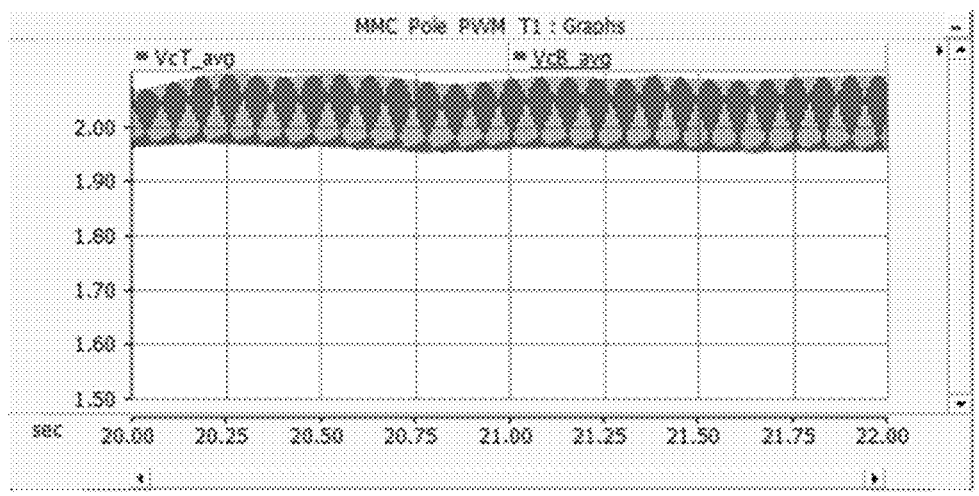
Figure 11B:
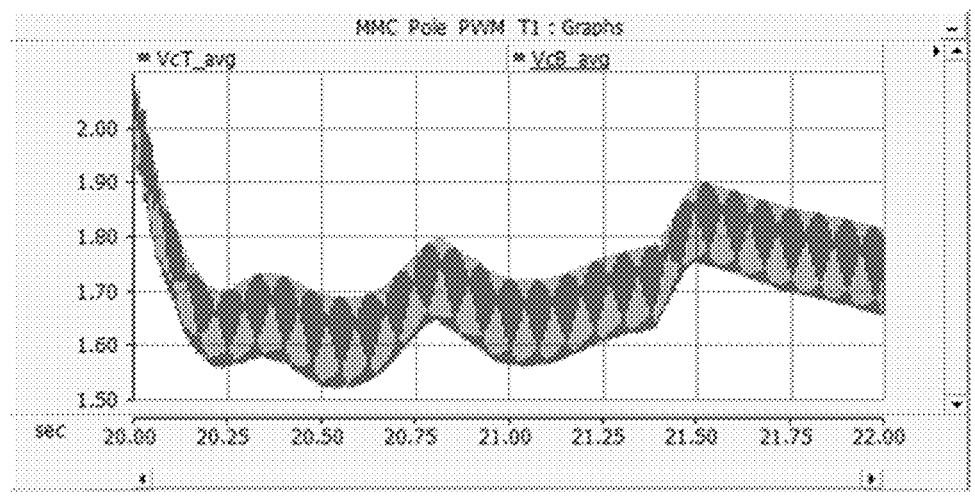
Figure 11C:
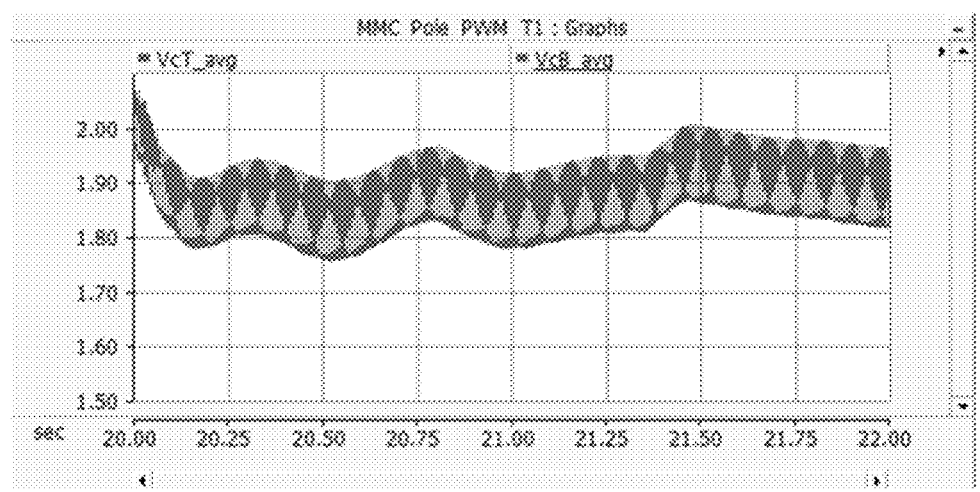
Figure 12A:
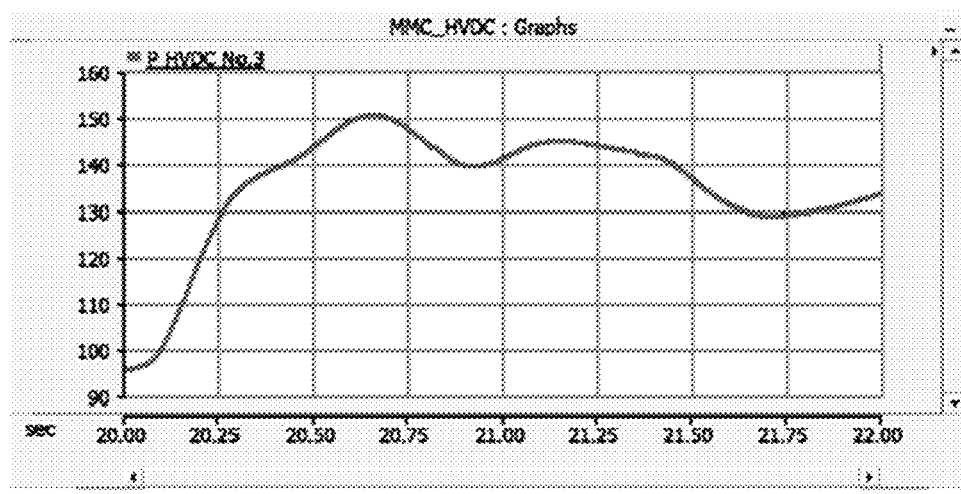
Figure 12B:
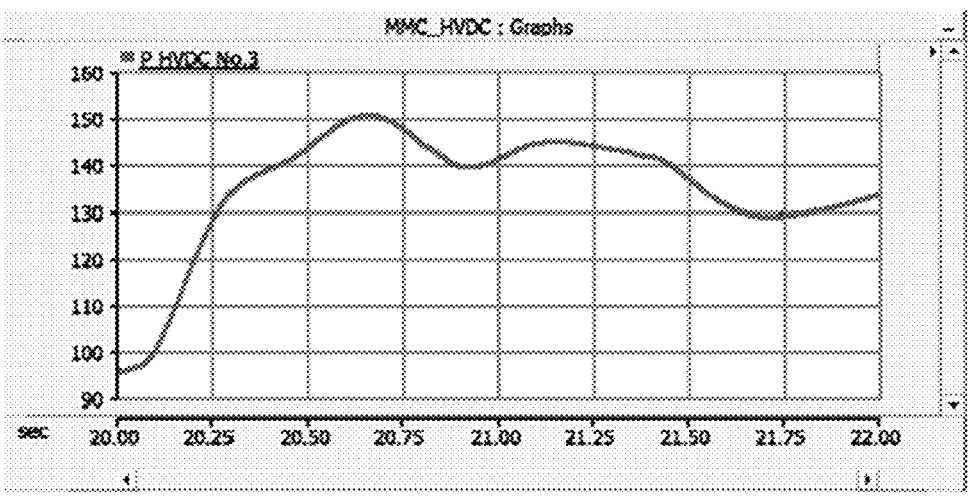
Figure 12C:
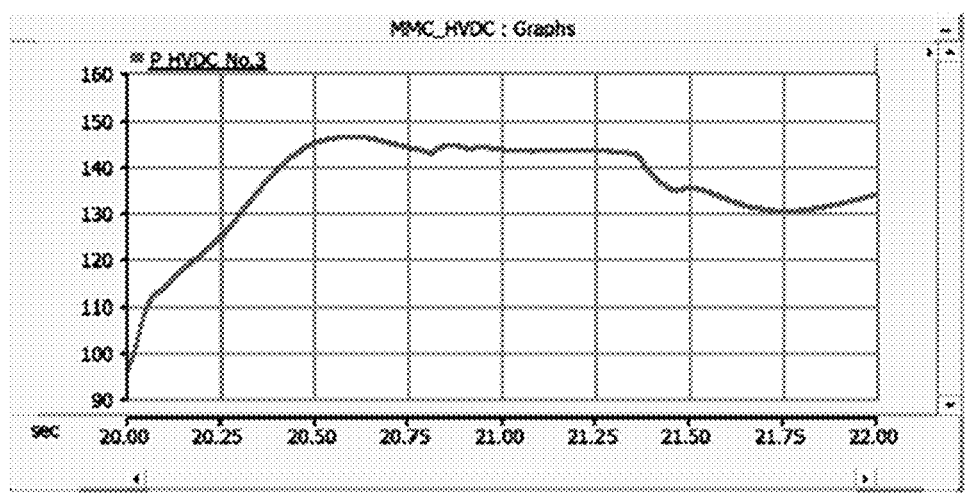

In FIGS. 10A-10C, it can be seen that in the case of FIG. 10A in which inertia was not provided as a waveform for improving frequency response after application of the system, in the case of FIG. 10B and FIG. 10C in which inertia was provided, fluctuations in the system frequency were less. FIGS. 11A-11C show that as the waveform for the voltage change of the submodule, the number of submodules participating in the operation is increased to adjust the number of output levels of the MMC converter, so that the voltage of each submodule decreases from the rated voltage. In FIGS. 12A-12C, it can be seen that the amount of power change is less when FIG. 12B, FIG. 12C, and guy inertia are provided than in the case of FIG. 12A in which inertia is not provided as the amount of power change in the HVDC system.

In the above description, although it is described that all the components constituting the embodiment of the present invention are integrally combined or operated in combination, the present invention is not necessarily limited to such an embodiment. That is, within the scope of the present invention, all of the components may be operated in at least one selective combination. In addition, the terms "comprise", "constitute", or "have" described above mean that corresponding components may be included unless specifically stated otherwise. Accordingly, it should be construed that other components are not excluded, but may further be included. All terms including technical and scientific terms have the same meanings as commonly understood by those skilled in the art unless otherwise defined. Such terms as those defined in a generally used dictionary are to be interpreted as having meanings equal to the contextual meanings in the relevant field of art, and are not to be interpreted as having ideal or excessively formal meanings unless clearly defined as having such in the present invention.

The above description is merely illustrative of the technical idea of the present invention, and various modifications and variations may be made without departing from the essential characteristics of the present invention by those skilled in the art to which the present invention pertains. Accordingly, the embodiment disclosed in the present invention is not intended to limit the technical idea of the present invention but to describe the present invention, and the scope of the technical idea of the present invention is not limited by the embodiment. The scope of protection of the present invention should be interpreted by the following claims, and all technical ideas within the scope equivalent thereto should be construed as being included in the scope of the present invention.

The invention claimed is:

1. A method for controlling output levels of an MMC converter, comprising:
a detection step of detecting a power grid frequency of a power grid connected to the MMC converter in real time;
a comparison step of comparing the detected power grid frequency with a preset reference power grid frequency; and
an adjustment step of adjusting a number of output levels of the MMC converter to reduce a difference between the detected power grid frequency and the reference power grid frequency when the detected power grid frequency and the reference power grid frequency are different from each other,
wherein the adjustment step includes adjusting the number of output levels of the MMC converter calculated by the following equation:

$$n_{level} = \frac{V_{DC}}{\sqrt{K_2 V_{SM,avg}^2}}$$
$$= \frac{N_{level}}{\sqrt{K_2}}$$

$$K2 = 1 - 0.75 \cdot (f_0 - f) / (K_{f,max} \cdot f_0)$$

$K_2 = 1 - 0.75 * (f_o - f)/(K_{f,max} * f_o)$ and $N_{level}$ is the number of output levels of the MMC converter before adjustment, $f_0$ is a preset reference power grid frequency of the power grid, f is a power grid frequency detected in the power grid, and $K_{f,max}$ is a preset control parameter constant.

2. The method of claim 1, further comprising:
a step of transferring a voltage corresponding to a difference between an output voltage of each of submodules which are operated according to the calculated number of output levels of the MMC converter after the adjustment step and the rated DC voltage to the power grid.

3. The method of claim 1, wherein the adjustment step includes:
generating a submodule voltage command value corresponding to the difference between the power grid frequency and the reference power grid frequency;
generating a d-axis current control command value for controlling active power through PI control to reduce a difference between the generated submodule voltage command value and the mean voltage of the submodule; and
controlling an AC current output from the MMC converter according to the generated d-axis current control command value.

4. The method of claim 1, wherein the adjustment step includes:
generating a DC voltage command value of the MMC converter corresponding to a difference between the power grid frequency and the reference power grid frequency;
generating a DC current command value through PI control to reduce a difference between the generated DC voltage command value and a DC voltage of the MMC converter; and
controlling a DC current output from the MMC converter according to the generated DC current command value.

5. The method of claim 1, wherein the adjustment step includes:
generating a submodule voltage command value corresponding to a difference between a DC voltage of an output terminal of the MMC converter and the rated DC voltage;

generating a DC current command value through PI control to reduce a difference between the submodule voltage command value and a mean voltage of the submodule; and controlling a DC current output from the MMC converter according to the generated DC current command value.

\* \* \* \* \*